Patented May 30, 1950

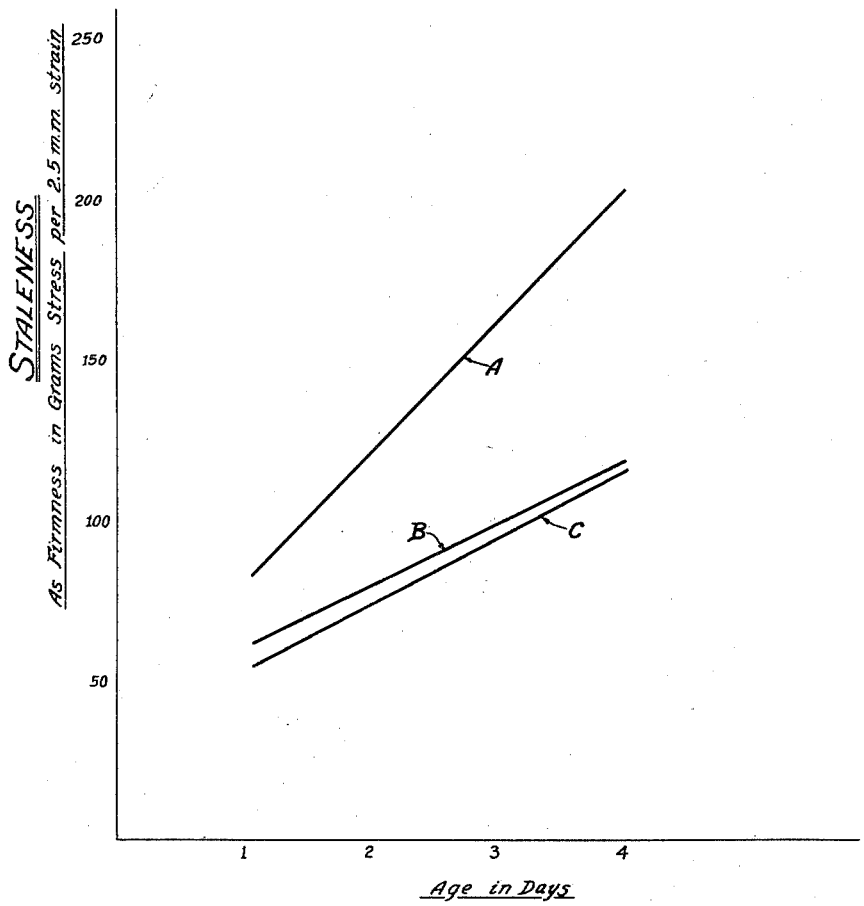

2,509,926

UNITED STATES PATENT OFFICE 2,509,926

PROCESS OF RETARDING STIFFENING OF BREAD

Norman F. Johnston, East Norwalk, Conn.; dedicated to the People of the United States of America, by R. T. Vanderbilt Co., Inc., New York, N. Y., a corporation of New York, assignee Application May 3, 1947, Serial No. 745,738

3 Claims. (Cl. 99—91)

This invention relates to the production of improved bread, rolls and sweet yeast-raised bakery products, and more particularly relates to the production of such bakery products that remain soft and fresh longer.

The housewife, as has been established by marketing research, commonly selects bread on the basis of softness. A hard or firm feeling loaf of bread she adjudges stale even though it may be less than twelve hours from the oven. As a consequence of this tendency most commercial bakers do everything possible to make their products soft.

Stale bread is sometimes sold at a discount but even this does not use up a store's supply and much of it is returned to the baker to be used up as bread crumbs or sold as animal food. Such practices are wasteful and expensive and the baker is always concerned with better ways of solving the "stale-return" problem.

Soft bread is commonly produced by keeping baking time to a minimum, by adjusting the formula used and by mixing, fermenting and handling the dough in such a way that the gas formed by the yeast is held in small cells having very thin cell walls. Mineral dough conditioners, malt syrup and invert syrup are ingredients often used for imparting softness.

Staleness in bread is accomplished by a number of changes. Thus, the loaf becomes progressively firmer, the crumb feels firmer, drier and more friable, and the flavor gradually changes. Rate of staling can be measured most satisfactorily by recording the increase in firmness of the crumb by some mechanical means, but methods measuring the decrease in ability of the crumb to absorb water and the decrease in its soluble starch content have also been used.

The actual mechanism of bread staling has been studied for nearly one hundred years and is still not definitely known. It was early proved, however, that staleness is independent of moisture content, for bread aged in completely moisture-proof containers would still go stale. Later theories pointed toward an exchange of water between the starch and gluten fractions of the bread as the causative factor. These theories have since been considered of doubtful accuracy and the most recent theories suggest that staling is caused by a chemical or physical change in the starch fraction alone. This fact, together with the observation that a loaf of stale bread acquires freshness on heating, indicates to me that bread staling depends on changes in the starch-water relationship. The starch-water relationship is known to change in starch pastes themselves which retrograde or set-up with age and it is quite likely that the same thing occurs to the partially gelatinized starch in a loaf of bread.

The present invention is based on the discovery that bread and similar products can be made significantly softer and their rate of staling considerably retarded by adding to the dough during the mixing period a suitably modified polyhydric partial ester of a higher fatty acid.

By modified partial esters I mean partial esters whose hydrophilic character has been enhanced by the introduction of additional hydroxyl or oxyalkylene groups. Such groups may be introduced by reaction of the partial ester with an alkylene oxide as described in detail in U. S. Patents 1,959,930 and 1,970,578. Esters modified in this manner are said to be catenylated. The alkylene oxide may be reacted with a sugar or polyhydric alcohol and the product obtained subjected to partial esterification, with a higher fatty acid. Such an ester is said to be a dendro compound. Polymerized diols, triols, tetrols, etc., which have been partially esterified, make up another class of modified esters.

The valuable anti-staling agents of my invention are all modified esters of the straight-chain monocarboxylic acids having 12 or more carbon atoms with polyhydric alcohols (such as diols, triols, tetrols, pentitols, hexitols) and their anhydrides (such as hexitans and hexides), with alkylene oxide treated sugars or polyhydric alcohols, and with polymerized polyhydric alcohols (such as polyethylene glycol, polyglycerol, etc.) The mono esters in general are most effective but the di, tri, and higher partial esters may be utilized by increasing the proportion of hydroxyl or oxyalkylene groups through a higher degree of modification.

The modified partial esters may be conveniently classified in three groups according to their mode of preparation.

*Group I.—Partially esterified dendro polyhydroxy compounds*

Example.—6-dendro glucose monostearate— where the reaction product of one mole of glucose and 6 moles of ethylene oxide has been esterified with one mole of stearic acid.

*Group II.—Catenylated partial esters of long chain aliphatic acids with polyhydroxy compounds*

Example.—Sorbitan monostearate 20 catenyl ethylene oxide—where one mole of sorbitan monostearate has been condensed with 20 moles of ethylene oxide.

*Group III.—Partial esters of aliphatic acids with polymerized polyhydric alcohols*

Example.—Nonaethylene glycol monostearate.

To distinguish between esters of Group I and esters of Group II the terms "dendro" and "catenyl" have been utilized in their nomenclature. "Dendro" is used where the polyhydric alcohol or sugar has been reacted with an alkylene oxide or polymer before esterification. "Catenyl" is used where the ester has been first prepared and then catenylated or reacted with the alkylene oxide or polymer thereof.

The modified esters of Group III may be prepared either by direct esterification of a polymerized polyhydric alcohol or by the reaction of the corresponding quantity of an alkylene oxide with the acid.

The following list of effective anti-staling agents, further illustrates the type of partial ester useful in the process of my invention:

6-dendro glucose monostearate
Nonaethylene glycol monostearate
Nonaethylene glycol monooleate
Sorbitan monostearate, 20 catenyl ethylene oxide
6-dendro glucose monostearate, 4 catenyl ethylene oxide
6-dendro glucose monostearate, 20 catenyl ethylene oxide
Sorbitan monolaurate, 20 catenyl ethylene oxide
Sorbitan monostearate, 18 catenyl ethylene oxide
Sorbitan monostearate, 16 catenyl ethylene oxide
Sorbitan monostearate, 14 catenyl ethylene oxide
Sorbitan monostearate, 12 catenyl ethylene oxide
Sorbitan monostearate, 10 catenyl ethylene oxide
Sorbitan monostearate, 8 catenyl ethylene oxide
Sorbitan monostearate, 6 catenyl ethylene oxide
Sorbitan monostearate, 4 catenyl ethylene oxide
Sorbitan monostearate, 50 catenyl ethylene oxide
Sorbitan monostearate, 100 catenyl ethylene oxide
6-dendro propylene glycol glucoside monostearate
6-dendro propylene glycol glucoside distearate
6-dendro propylene glycol glucoside tetrastearate
Polymerized glycol dioleate
Polymerized diglycol stearate
Sorbitan monostearate, 10 catenyl propylene oxide
6-dendro sorbitan monostearate
20-dendro sorbitan monostearate
6-dendro sorbitan monolaurate
6-dendro glucose tetrastearate.

Some of the esters, the 6-dendro glucose monostearate, for example, are hard waxy substances which before being applied according to my invention must first be rendered soft and plastic as by hydration. In the case of the 6-dendro glucose monostearate I generally achieve the desired softening by thoroughly mixing the ester with twice its weight of water in a high speed mixing device, a Waring Blendor, for example. Alternatively, the softening may be achieved by adding the melted ester to the water, warmed to a temperature of about 160° F. and continuously stirring the mixture while cooling to room temperature.

Of the modified esters specifically named herein, I particularly prefer, because of the especially good results I have attained therewith, 6-dendro glucose monostearate, the compound just discussed above, and nonaethylene glycol monostearate. The physical nature of the latter compound is such that it does not require any preliminary treatment before use.

A small quantity only of the modified ester is required to make the bread softer and retard its rate of staling. Thus, amounts ranging from 0.5% to 2% on the weight of the flour in the formula have been found to yield particularly good results. Amounts ranging from about 0.1% to about 3.5% are useful. Any type of yeast-raised bakery product prepared according to the invention will be much softer than normal and will retain its freshness and softness for several days longer.

The following examples, submitted in illustration of the invention, are not to be taken as in any way limitative of the scope thereof.

EXAMPLE I

This example illustrates the manufacture of a white pan bread according to the invention.

FORMULA

| Sponge | Dough |
|---|---|
| 60 lbs. hard wheat flour<br>36 lbs. water<br>2 lbs. yeast<br>¼ lb. yeast food | 40 lbs. hard wheat flour<br>25 lbs. water<br>2 lbs. salt<br>3 lbs. sugar<br>1 lb. malt syrup<br>4 lbs. Dry Milk<br>2 lbs. Shortening<br>¼ lb. hydrated 6-dendro glucose monostearate. |

PROCEDURE

*Sponge*

Dissolve the yeast in a portion of the water (72° F.) and add to mixer, along with flour, yeast food and the balance of the water. Mix just enough to make a homogeneous mass, dump into a trough and ferment for 5½ hours at 72° F.

*Dough*

Return fermented sponge to mixer, add all the dough ingredients including the dendro compound and mix until smooth. Allow to stand about 15 minutes, divide, round, allow to stand again, mold, pan, proof at 95° F. to top of pans and bake at 420° F. until uniformly brown, about 30 minutes with steam in oven. Cool slowly to room temperature and wrap in moisture-proof paper.

EXAMPLE II

This example illustrates the invention as applied to the production of sweet yeast-raised dough for coffee cake, tea rings and the like.

FORMULA

| | Pounds |
|---|---|
| Bread flour | 76.5 |
| Pastry flour | 23.5 |
| Milk | 47 |
| Yeast | 6 |
| Sugar | 12 |
| Malt syrup | 3 |
| Salt | 1 |
| Shortening | 15 |
| Eggs | 9 |
| Nonaethylene glycol monostearate | 1 |
| Flavoring, to suit | |

PROCEDURE

Cream the malt, sugar, salt and shortening. Add the eggs gradually and cream until light. Add the flavoring and modified ester. Dissolve the yeast in a quarter of the milk. Place the balance of the milk in the bowl with the creamed mass and stir well to dissolve the ingredients. Add the bread flour and start mixing. Pour in the yeast solution, add the pastry flour and continue mixing until smooth. Have the dough at 80° F. when mixed. Allow dough to rise to full punch, then take to bench in 15 minutes. Scale, make up into desired shapes, proof to double their size and bake.

EXAMPLE III

This example illustrates the invention as applied to the production of buns or rolls such as are used for "hamburgers" and "hot dogs."

FORMULA

| Ingredient | Unit | Amount |
|---|---|---|
| Bread flour | pounds | 8½ |
| Water | quarts | 2 |
| Yeast | ounces | 2 |
| Salt | do | 1¾ |
| Sugar | do | 5 |
| Milk powder | do | 5 |
| Shortening | do | 8 |
| Nonaethylene glycol monostearate | do | 1½ |

PROCEDURE

Dissolve yeast in some of the water, then place in mixer with all the other ingredients. Mix until smooth and well developed. Dough should be 78° F. when taken from mixer. Ferment approximately as follows: First rise 1¾ hours, second rise 45 minutes and then work off in another 15 minutes.

If scaled at 18 g. per dozen, this batch makes approximately 12 dozen rolls.

The dendro compound of Example I gives similar results when substituted in the above formula.

EXAMPLE IV

Three six-loaf batches of bread adapted from a commercial formula were prepared and tested for rate of staling or hardening with a compressimeter. The first batch was a control containing no anti-staling agents, the second comprised .5% of dendro glucose monostearate (anhydrous basis) and the third .5% of nonaethylene glycol monostearate.

All the bread was baked by a standard procedure, cooled in an air-conditioned cabinet, wrapped in moistureproof cellophane and loaves of identical size measured for softness of crumb at predetermined intervals. Results of the test are shown by the accompanying graph in which the staleness, expressed as firmness in grams stress per 2.5 millimeters strain, is plotted against the number of days ageing and in which line A refers to the control bread, line B to the bread prepared with the addition of the dendro compound and line C to the bread prepared with the addition of the nonaethylene glycol monostearate.

I claim:

1. In the preparation of yeast-raised bakery products, the method of decreasing rate of staling which comprises mixing into the dough a small amount of a material selected from the group consisting of reaction products of a polyhydroxy compound and an alkylene oxide which have been partially esterified with a straight chain monocarboxylic acid having at least 12 carbon atoms and reaction products of an alkylene oxide and a partial ester of a polyhydroxy compound and a straight-chain monocarboxylic acid having at least 12 carbon atoms.

2. In the preparation of yeast-raised bakery products, the method of decreasing rate of staling which comprises mixing into the dough in an amount equivalent to about 0.5% to 2% of the weight of the flour in the dough a material selected from the group consisting of reaction products of a polyhydroxy compound and an alkylene oxide which have been partially esterified with a straight chain monocarboxylic acid having at least 12 carbon atoms and reaction products of an alkylene oxide and a partial ester of a polyhydroxy compound and a straight-chain monocarboxylic acid having at least 12 carbon atoms.

3. In the preparation of yeast-raised bakery products, the method of decreasing rate of staling which comprises mixing into the dough an amount of plasticized 6-oxyethylene glucose monostearate equivalent to about 0.5% to 2% of the weight of the flour in the dough.

NORMAN F. JOHNSTON.

REFERENCES CITED

The following references are of record in the file of this patent:

UNITED STATES PATENTS

| Number | Name | Date |
|---|---|---|
| 2,033,195 | Joffe | Mar. 10, 1936 |
| 2,132,436 | Reynolds | Oct. 11, 1938 |
| 2,132,700 | Richardson | Oct. 11, 1938 |
| 2,132,701 | Richardson | Oct. 11, 1938 |
| 2,422,486 | Johnson | June 17, 1947 |

OTHER REFERENCES

Atlas Spans and Tweens, Indus. Chem. Dept., Atlas Powder Co., June 1945, pages 1, 2.